United States Patent
Itkowsky et al.

(10) Patent No.: US 6,295,281 B1
(45) Date of Patent: Sep. 25, 2001

(54) SYMMETRIC FLOW CONTROL FOR ETHERNET FULL DUPLEX BUFFERED REPEATER

(75) Inventors: Frank A. Itkowsky, Leominster; James S. Hiscock, Burlington; Cary B. Robins, Newton, all of MA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 08/857,471

(22) Filed: May 16, 1997

(51) Int. Cl.$^7$ ..................................................... H03B 3/36
(52) U.S. Cl. .......................... 370/293; 370/229; 370/412; 375/211; 710/107
(58) Field of Search ...................... 370/229, 230, 370/235, 276, 277, 278, 279, 280, 282, 293, 412; 375/211, 213; 395/107, 287, 289; 710/292, 293, 872, 877

(56) References Cited

U.S. PATENT DOCUMENTS

| | | | |
|---|---|---|---|
| 5,265,123 | * 11/1993 | Vijeh et al. | 375/211 |
| 5,345,447 | * 9/1994 | Noel | 370/362 |
| 5,430,762 | * 7/1995 | Vijeh et al. | 375/211 |
| 5,742,603 | * 4/1998 | Shafir et al. | 370/401 |
| 5,754,877 | * 5/1998 | Hagersten et al. | 395/800.29 |
| 5,802,310 | * 9/1998 | Rajaraman | 709/234 |
| 5,805,839 | * 9/1998 | Singhal | 395/292 |
| 5,905,870 | * 5/1999 | Mangin et al. | 395/200.64 |
| 6,052,376 | * 4/2000 | Wills | 370/419 |

OTHER PUBLICATIONS

"*Gigabuffer Repeater Proposal*", Packet Engines Incorporated proposal, Sep. 7, 1996.

"*Gigabit Buffered Distributor Proposal*", Packet Engines Incorporated proposal, Nov. 21, 1996.

* cited by examiner

Primary Examiner—Douglas Olms
Assistant Examiner—Bob A. Phunkuch
(74) Attorney, Agent, or Firm—Weingarten, Schurgin, Gagnebin & Hayes LLP

(57) ABSTRACT

Symmetric flow control in a buffered repeater having responsiveness to flow control frames. An Ethernet full duplex buffered repeater according to the present invention includes an internal arbitration mechanism allowing receive FIFOs of respective receive ports to transmit data over a local bus to remaining transmit ports in round-robin fashion. The transmit ports take the transmitted data off the local bus and transmit it over the respective link. Each transmit port monitors the capacity of an associated transmit FIFO, and when the available capacity falls below that required to store a maximum size frame, asserts an open collector output signal monitored by each of the ports. No port initiates transmission of a packet over the local bus when this signal is asserted. Rather than one of the transmit ports risking being unable to store a complete frame once transmission has begun, the local bus is suspended before the next frame is put on the local bus. As the receive FIFOs fill, Pause Frames are issued by the respective port over each associated link. Each port is responsive to received flow control frames for pausing transmission of data over the respective link. Each buffered repeater is cascadable with other such devices to implement an arbitrarily large buffered repeater.

14 Claims, 4 Drawing Sheets

Legend:

| | |
|---|---|
| GMAC | Gigabit MAC |
| MGT | Network Management Registers |
| MRFI | MAC/Receive FIFO Interface |
| MTFI | MAC/Transmit FIFO Interface |
| RFIFO | Receive FIFO |
| TFIFO | Transmit FIFO |
| BRFI | Bus/Receive FIFO Interface |
| BTFI | Bus/Transmit FIFO Interface |
| BRI | Bus Receive Interface |
| BTI | Bus Transmit Interface |
| BAR | Bus Arbiter |
| PCI | Processor Interface |
| LEDI | LED Interface |

SYMMETRIC FLOW CONTROL FOR ETHERNET FULL DUPLEX BUFFERED REPEATER

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

Ethernet is a local-area network (LAN) design which employs carrier sense multiple access with collision detection (CSMA/CD) as an access control method. When a device wishes to transmit a packet on the LAN, it first listens to the network to determine if any other device is currently transmitting, and waits if the network is busy. Otherwise, the device begins transmitting its packet, while simultaneously listening to the bus to determine if the packet collided with other network traffic. If such a collision is detected, the device ceases transmission, then checks for an idle network again before retransmitting.

An Ethernet repeater is a network element which provides a common point for receiving packets from individual devices and for retransmitting the packets to other devices. A buffered repeater must be employed when full duplex links are used. An Ethernet buffered repeater provides temporary storage of received packets prior to transmission to all other interconnected devices. However, the discrete amount of memory available for queuing received data can be filled. To address this situation, the architecture for the Ethernet buffered repeater uses a flow control technique specified by the IEEE 802.3x standard. According to this architecture, a buffered repeater port which is receiving packets transmits a flow control frame to the transmitting port at the other end of the respective link to suspend packet transmissions to the repeater for some specified period of time when the buffered repeater port can no longer receive additional incoming packets, presumably because its receive buffer is filling up.

This architecture also provides for a discrete buffer space at each transmit port. However, this buffer space can also be filled. When the port at the other end of the respective link can no longer receive data from such a buffered repeater transmit port, the respective receiving port transmits a flow control frame to the buffered repeater, and in response the buffered repeater transmit port is required to suspend the transmission of data.

Due to the high transmission speeds utilized in the next generation of Ethernet, known as Gigabit Ethernet, repeater buffer spaces can easily be filled before feedback can be provided to a source for slowing or temporarily stopping the flow of data into the repeater. This necessitates the inefficient retransmission of incompletely received packets.

Previous approaches adhering to the IEEE 802.3x standard have required the provision of a relatively large transmit FIFO buffer in order to allow the transmit data to queue up while the link is thus disabled. However, it is generally acknowledged that it is not cost-effective for a buffered repeater to support both large transmit and receive queues. One proposal for addressing this situation prohibits buffered repeater transmit ports from being flow-controlled off. In other words, such buffered repeater transmit ports are not to respond to received flow control frames. Each buffered repeater receive port is therefore allowed to send flow control frames to a respective remote port as the receive queue fills, but the respective buffered repeater transmit port does not accept flow control frames from the remote port due to remote congestion. Such a proposal has been labelled Asymmetric Flow Control, and necessarily implicates packet loss due to downstream congestion, retransmission of the lost packets, and consequent reduction in available bandwidth.

Therefore, buffered repeaters, which meet the applicable industry standard, have heretofore been unable to accommodate high-rate Ethernet traffic without either large transmit buffer spaces or the inefficient loss and retransmission of packets associated with Asymmetric Flow Control.

BRIEF SUMMARY OF THE INVENTION

The presently disclosed method and apparatus enables symmetric flow control in a buffered repeater according to IEEE 802.3x without implicating packet loss due to ignored flow control frames, and without requiring the provision of a relatively large transmit queue. This method and apparatus is applicable in particular to Gigabit Ethernet LAN applications, though the concept of the method and apparatus are suitable for use at other rates and in other environments.

An Ethernet full duplex buffered repeater according to the present invention includes a media access controller (MAC) associated with each port to parse the packets received, and a FIFO buffer memory associated with a receive portion of each full duplex port to buffer received packets. IEEE 802.3x flow control techniques are employed to keep the FIFOs from overfilling. An internal arbitration mechanism is used to allow each of the respective receive FIFOs to have a turn transmitting data over a local bus to the remaining transmit ports in a round-robin fashion. A transmit FIFO buffer memory associated with the transmit portion of each full duplex port is employed to buffer data for the transmit port, though this transmit FIFO is reduced to a relatively small size.

In a first embodiment, four repeater ports are associated with each buffered repeater device, and all of the associated FIFOs and logic necessary to implement the repeater are fabricated within the device. Each device is cascadable with other such devices to enable implementation of an arbitrarily large buffered repeater, in increments of four ports. The present device is capable of interfacing directly to industry standard 10:1 Serializer/Deserializer (SERDES) devices which in turn interface to optic or copper physical layer devices.

The present buffered repeater enables the support of symmetric flow control without the requirement of a relatively large transmit queue. As the receive queues store data, the arbitration mechanism controls which of the receive queues having data will transmit the data over the local bus within the buffered repeater. All of the other ports, that is to say the ports other than the one transmitting data over the local bus, take the transmitted data off the local bus and transmit it out across the respective links to which each port is connected.

Each of the MACs monitors the incoming data stream for Pause Frames received as a result of a respective receiving device being unable to accommodate data being transmitted from the buffered repeater port. When a Pause Frame is received at a port, the MAC starts a pause counter as specified in the standard implementation of IEEE 802.3x Flow Control. In addition, this port asserts an output signal, BUS_XOFF. By implementing this signal as an open collector output and asserting the signal by pulling it low, all of the BUS_XOFF signals, from each of the ports, are logically OR'd together; when any one of the ports pulls this signal low, the BUS_XOFF signal is asserted for the device. Each of the receive ports monitors the state of this signal line, and no port will initiate the transmission of a packet over the local bus when this signal is asserted low. Thus, when any one port is required to suspend data transmission, the transfer of data within the repeater is suspended. As the receive FIFOs fill, Pause Frames are issued by the respective MAC over each associated link. This is consistent with existing layer 1 devices in which an overloaded port holds off the shared media by causing artificial collisions.

BRIEF DESCRIPTION OF THE DRAWINGS

The invention will be more fully understood by reference to the following description in conjunction with the accompanying drawings of which.

DETAILED DESCRIPTION

Figure 1:
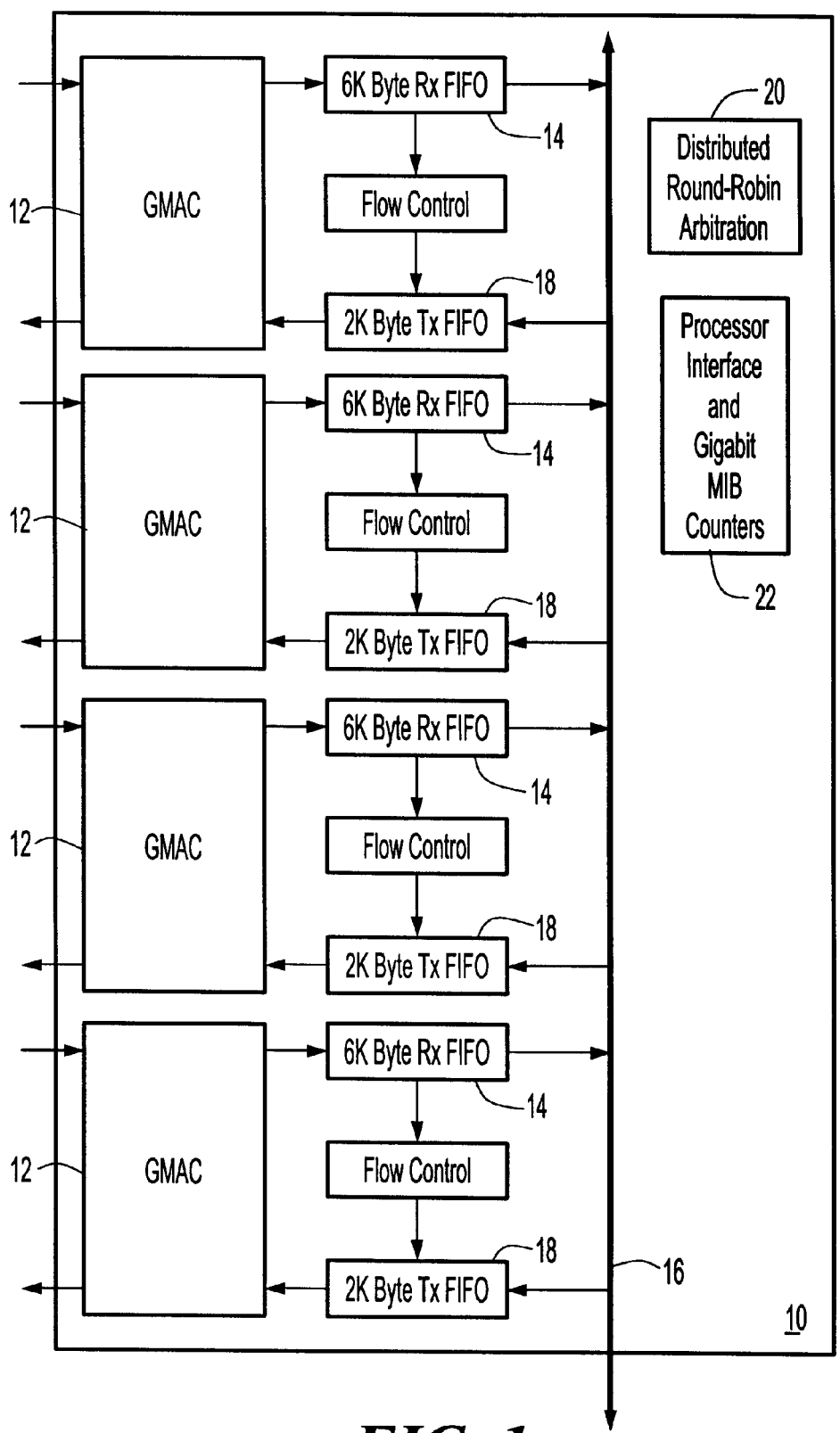
FIG. 1 is a block diagram of a symmetric flow control Ethernet full duplex buffered repeater according to the present invention.
Figure 2:
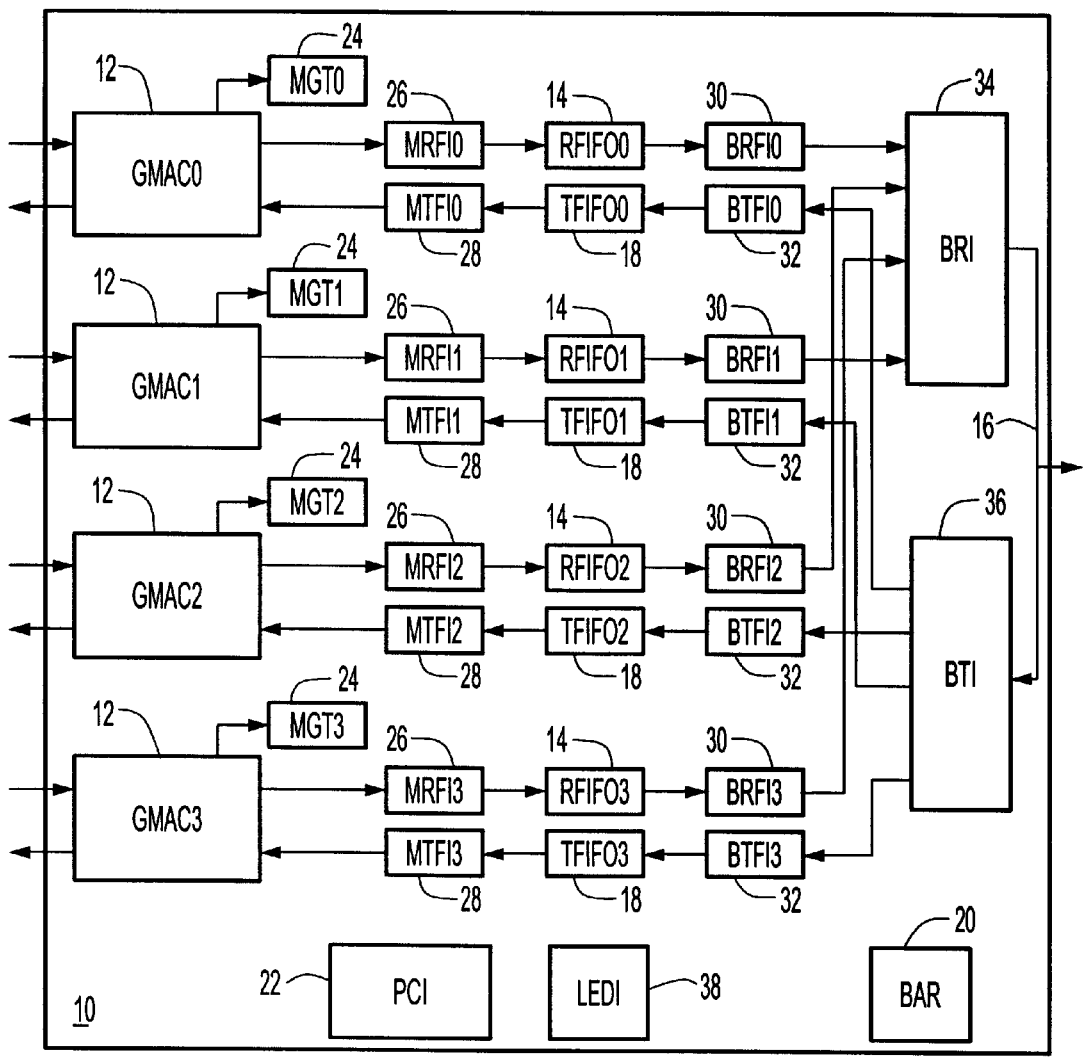
FIG. 2 is a more detailed block diagram of the full duplex buffered repeater of FIG. 1.

The present invention provides a Gigabit Ethernet Full Duplex Buffered Repeater (or Buffered Distributor) and a method of using such device. In a first embodiment illustrated in FIGS. 1 and 2, the device is implemented on a single integrated circuit 10. A media access controller (MAC), or in the illustrated case a gigabit media access controller (GMAC) 12, controls the receipt and transmission of packets through the associated port and link for each of plural ports. Receive queues or FIFOs 14 enable the buffering of received packets which have been parsed by the associated GMAC 12. Given an arbitrated opportunity, each port will provide the received and parsed data from the receive queue 14 to a local bus 16. As one port transmits this received data onto the local bus 16, all other ports remove the data from the local bus 16 and begin transmitting the data across the respective links. A transmit queue or FIFO 18 associated with each port enables this transmission. An arbitration mechanism 20 to determine which port can transmit over the local bus 16 at one time is also provided, along with a processor interface or PCI 22 which enables external configuration control over the buffered repeater. The latter configuration control includes the adjustment of various buffered repeater-internal registers, such as the network management registers 24.

The GMAC 12 interfaces to SERDES devices (not shown) via two ten-bit wide data paths, one for transmit and one for receive. In a first embodiment, both transmit and receive rates are 125 MHz. The function of the SERDES device is to convert the 10 bit symbol from the repeater 10 to a serial data stream running at 1.25 Gbits/sec, and to convert a similar data stream to 10 bit symbols arriving at the 125 MHz data rate.

Figure 3:
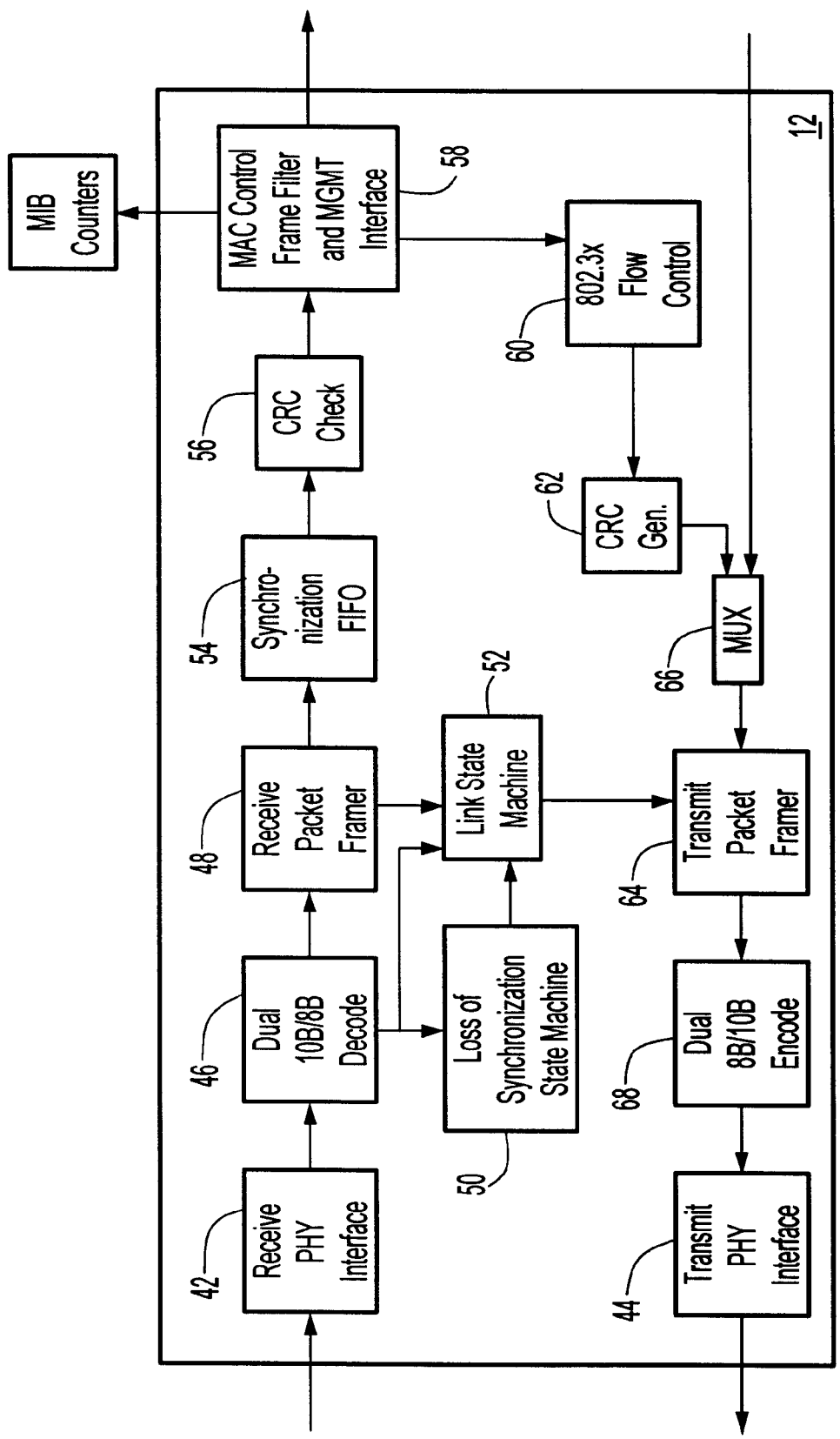
FIG. 3 is a detailed block diagram of a gigabit media access controller (GMAC) according to the present invention.

With regard to FIG. 3, each GMAC 12 receive PHY interface 42 has dual mechanisms that alternately receives and concatenates every other input symbol to create a 20 bit wide receive data word at a 62.5 MHz rate. After dual 10B/8B decode mechanisms 46 apply the appropriate decoding, the incoming data stream is parsed into packets by a receive packet framer 48, and additional bits are added to indicate Start of Packet (SOP) and End of Packet (EOP). A loss of synchronization state machine 50 is employed to initially establish or re-establish synchronization of the incoming data. A link configuration state machine 52, or simply the link state machine, establishes communications with the far end of the respective link, including auto-negotiating whether the remote port supports full or half duplex operation, or both, and whether the link supports symmetric, asymmetric, or no flow control. A synchronization FIFO 54 enables the decoupling of the data from the external, input clock, and the synchronization with an internal 125 MHz crystal. After a CRC check of the packet by the CRC check circuit 56, the data word is doubled to 32 bits, and a status word is appended by a MAC Control Frame Filter and MGMT Interface 58.

An 802.3x Flow Control block 60 monitors the incoming data stream as it leaves the CRC Checker 56 to identify flow control frames. This block 60 also maintains a flow control timeout counter, and provides a local bus disable signal until the counter counts down to zero, or is reset to zero. The flow control block further transmits, locally, the XON and XOFF frames based upon receive FIFO 14 status. A CRC Generation block 62 generates the CRC for MAC control frames sourced by the flow control block 60.

A transmit packet framer 64 and a subsequent Dual 10B/8B Encode block 68 receives data from either the Flow Control block 60 or from a MAC transmit FIFO interface 28, via a mux 66. Their function includes the receipt of a transmit frame in the 32-bit wide format, splitting the words into 16-bit format, encoding the words as appropriate, and supplying the appropriate framing on the packet. The packet is then transmitted out of the GMAC 12 ten bits at a time at 125 MHz via a Transmit PHY Interface 44.

The GMAC 12 is responsible for implementing full-duplex flow control according to the IEEE 802.3x standard. This includes the recognition of pause frames, including a pause time value which represents the number of time slots the GMAC 12 should hold off before transmitting another frame. Upon receipt of the pause frame, the GMAC 12 has one time slot to recognize and act on the frame; it may finish the frame currently being transmitted. Flow control can also be implemented with an XON/XOFF type protocol by alternatively transmitting pause frames with very large pause times and then pause times of zero, since the count time from the new pause frame supersedes that of the old pause frame.

When the GMAC 12 recognizes a received flow control frame, it is tagged for discard downstream, and causes the transmit side to load the flow control counter with a new count value. This counter is decremented every 512 bit times, and the transmit side will not initiate a new transmission whenever the counter is non-zero. The transmit side also contains the capability, via the 802.3x Flow Control block 60, of transmitting an 802.3x flow control frame out the associated link with a programmable count whenever the upstream logic indicates that it should do so.

Other responsibilities of the GMAC 12 include: implementing a Gigabit Ethernet Start-up State Machine; a Loss of Sync State Machine; and controlling the startup and synchronization of the associated SERDES device.

Statistical counters are maintained by the network management registers (MGT) 24, including: unicast packets;

broadcast packets; multicast packets; octets; CRC errors; 10B/8B decode errors; link failures; and pause frames received.

The MAC/Receive FIFO Interface (MRFI) 26 receives the 32 bit data stream from the GMAC 12, re-synchronizes the data to an internal clock, and forwards the data to the receive FIFO 14. All flow control frames from the GMAC 12 are filtered out by the MRFI 26. Finally, the MRFI 26 contains two programmable FIFO threshold registers, and is responsible for providing the GMAC 12 with information as to when XON and XOFF flow control frames are to be transmitted as a result of FIFO capacity passing one of these thresholds.

The MAC/Transmit FIFO Interface (MTFI) 28 takes the 32-bit data stream from the Transmit FIFO 18 and passes it to the GMAC 12 for transmission to the associated link. Statistical data is not collected in one embodiment since all packets that arrive on any receive port are transmitted out every other transmit port. Thus, software can simply sum the flow of traffic on all of the other receive ports to determine the traffic on any one transmit port. The MTFI 28 also maintains a read pointer for the transmit FIFO 18, transmit FIFO threshold registers and is responsible for propagating back a flow control message to the local bus 16.

In a first embodiment of the present invention, the device includes a 6 Kbyte receive FIFO 14 and a 2 Kbyte transmit FIFO 18 on each of the four ports. The purpose of the receive FIFO 14 is to buffer packets received on a port until the port gets a chance to transmit the data over the local bus 16 to all other ports. The size of the receive FIFO 14 is a function of how many packets are desired to be stored before flow controlling the link, plus any delay from hitting this threshold until the receive port cannot receive any more data. This calculation includes taking into account the following: the maximum size of a transmitted frame; the transmission of a pause frame by the transmitter; the pause frame delay through the link; pause frame recognition in the GMAC 12; the time needed by the remote port to finish transmitting the currently transmitted frame; and the time implicated in transmitting this last frame through the link.

The delay time is computed for each of the Gigabit Ethernet physical layers, such as single and multi-mode fiber, short haul copper, and aggregating backplane. While the receive FIFO can then be sized according to the largest delay for the physical layers, it is preferably sized to enable a continuous flow of data over the local bus 16. Therefore, an XON frame must be sent when the receive FIFO comes within a certain range of emptiness to restart remote transmission before the receive FIFO empties. For hysteresis considerations, it is desired that one maximum sized frame be storable between XON and XOFF thresholds to avoid the flow control mechanism from oscillating.

Based upon the foregoing, for a single mode fiber application, a receive FIFO of approximately 11 Kbytes is required. However, the presently disclosed device is not intended for 3 km fiber applications, since the cost of the physical layer interface so dominates the cost per port that a switch becomes an economically viable alternative to the presently disclosed repeater. For all other applications mentioned above, a 6 Kbyte receive FIFO is adequate. For example, the FIFO can be implemented as a 1.5×36 memory block, the latter being a dual ported RAM having control logic designed to make it work like a FIFO. In order to support applications where a number of backplane or short haul copper ports are aggregated to one or two 3 km fiber downlinks, a port cascading mode is implemented through the processor interface 22. In this mode, the receive FIFO 14 from port 1 is concatenated with the receive FIFO 14 from port 0. Likewise, the receive FIFO from port 3 can be concatenated with that of port 2. Thus, the presently disclosed device can be configured to have two ports, each with 16 Kbyte receive FIFOs, three ports where one has a 12 Kbyte receive FIFO and two with a 6 Kbyte receive FIFO each, or the default configuration of four ports, in which each has a 6 Kbyte receive FIFO.

The transmit FIFO 18 runs independently of the receive FIFO 14. It must be long enough for the transmitting side of the GMAC 12 to insert a transmit pause frame, also known as a flow control frame, into the data stream without requiring the entire local bus 16 to shut down while a pause frame is being transmitted. Because the GMAC 12 may be receiving a flow control frame at the same time it is transmitting a flow control frame and storing a frame being transferred on the local bus 16 into the transmit FIFO 18, the transmit FIFO 18 must also be large enough to accommodate a maximum sized frame. A 2 Kbyte memory block, configured for example as 512 by 36 bits, satisfies both requirements. This memory block can be a dual ported RAM with control logic configured to make it work like a FIFO. The transmit FIFO fills whenever a respective external port transmits a flow control frame, and empties whenever the corresponding buffered repeater receive port is transmitting over the local bus 16. Whenever the transmit side of the GMAC 12 is flow controlled off and the transmit FIFO fills past the point where it can accept another maximum sized frame, the signal BUS_XOFF is asserted to prevent another frame from being transferred over the local bus.

Each of the receive FIFOs 14 takes a turn transmitting a single frame at a time over the shared local bus 16. In a first embodiment, this bus 16 is a 32 bit bus running at 31.25 MHz. Arbitration between receive FIFOs 14 for this bus 16 can take different forms. In a preferred embodiment, a "round robin" arbitration mechanism is employed. From the point of view of the arbitration mechanism, the receive ports of the buffered repeater are configured in a ring topology, and each port takes a turn transmitting a packet over the local bus 16, then passing a "token" on to the next port in the ring. Even if all frames sizes are not equal, this provides an acceptably fair distribution of bandwidth. In order for the transmit FIFOs 18 to not grow arbitrarily large during normal operation, it is necessary for the bandwidth of the bus to not exceed the bandwidth at which each port is capable of transmitting. Thus, in one embodiment, it is necessary that the arbitration mechanism (BAR) 20 (FIGS. 1, 2, 4) insert at least five dead cycles on the bus between each frame. The local bus 16 is also extended external to the buffered repeater 10 to enable cascading multiple repeaters and to create larger port count buffered repeaters (discussed in conjunction with FIG. 4). Single arbitration token output and input lines are required to complete the ring with other buffered repeater devices.

The presently disclosed invention implements symmetric flow control by disabling the transmission of data on the local bus whenever any one port has received a flow control frame, causing its transmit FIFO to fill past the point where it can hold another maximum sized frame. Each port supports its own IEEE 802.3x flow control counter, and whenever a transmit FIFO of a port has filled past the point where it can hold another maximum sized frame, the port asserts an open collector BUS_XOFF signal internal to the device (unless multiple such devices are cascaded as subsequently described). Whenever this open-collector signal is asserted, the round robin arbitration is suspended and no frame transmissions over the local bus can occur. This then causes incoming traffic (relative to the buffered repeater) to back up in the respective receive FIFOs 14. When a receive FIFO reaches the respective flow control threshold, it transmits flow control frames out the respective port to delay receipt of incoming data. Thus, during a flow control event, only those receive ports receiving traffic need be flow controlled.

The transmit portion of each GMAC does not act on its own flow control counters, but rather allows the transmit FIFO control logic to control the data flow based upon how full the transmit FIFO is. The transmit portion of the GMAC 12 will always accept and transmit all data at its input. The purpose of the transmit FIFO 18 is to allow the insertion of flow control frames into the transmit data stream without having to stall data flow on the local bus 16. While the flow control frame is being transmitted, data can be read from the local bus and temporarily stored in the transmit FIFO. The transmit FIFO is emptied when that port is putting data onto the local bus, since a port does not transmit data it receives. In order to keep the local bus from being stalled, the transmit FIFO must be able to store all data read from the bus while the flow control frame is being transmitted. This amounts to the 512 bits of the flow control frame, plus minimum interframe gap, plus preamble, plus any other overhead.

However, the factor which determines the minimum size of the transmit FIFO is the IEEE 802.3x requirement that a port have 512 bit times to respond to a flow control frame. To meet this requirement for the case where a port receives a flow control frame at the same time it is transmitting a flow control frame and is also reading a frame from the local bus into the transmit FIFO, the transmit FIFO must be able to store the entire frame being read from the local bus, since the bus cannot be stalled until the end of the frame.

A 2 Kbyte FIFO, organized as a 512×36 memory block is utilized in a first embodiment. To be able to store an entire maximum size frame when the previously described condition occurs, the transmit FIFO causes the open-collector BUS_XOFF signal to be asserted when the transmit FIFO reaches the threshold of no longer having enough room to store a maximum size frame.

Asserting this BUS_XOFF signal results in the local bus 16 being flow-controlled off after completion of transmission of the current frame. If BUS_XOFF is asserted, a port will not start transmitting a new frame to the local bus. As soon as the transmit FIFO capacity falls below the threshold value, the BUS_XOFF signal is de-asserted, re-enabling the local bus 16. The foregoing results in scaling down the local bus bandwidth, though only when the system in which the device resides is heavily loaded.

A Bus/Receive FIFO Interface (BRFI) 30 provides an interface between the receive FIFO 14 and a Bus Receive Interface (BRI) 34, which in turn provides an interface to the local bus 16. The BRFI 30 is used to transfer data, control bits, and byte mask bits between the respective FIFO and the BRI 34, and to maintain a read pointer for the receive FIFO 14.

A Bus/Transmit FIFO Interface (BTFI) 32 provides an interface between a Bus Transmit Interface (BTI) 36 and the transmit FIFO 18. The BTFI 32 also provides write control operations for the transmit FIFO 18. The BTFI 32 uses its write pointer and a read pointer from the MTFI 28 to calculate how full the transmit FIFO 18 is.

Bus interfaces, BRI 34 and BTI 36 (FIG. 2), enable the ports within one device to communicate over the local bus 16 and further enable several buffered repeater devices to intercommunicate over a shared local bus 16. The BRI 34 contains the logic necessary to output data onto the local bus 16. When there is data in the receive FIFO 14, the BRI 34 indicates to the arbitration mechanism 20, also known as the Bus Arbiter (BAR) 20, that the respective port wants to output received data onto the local bus 16. When the BAR 20 indicates to the BRI 34 that the port in question may drive the bus 16, the BRI 34 checks to see that the local bus 16 has been idle at least five clock cycles. If so, the BRI 34 begins to output data immediately.

The BTI 36 contains logic necessary to receive data from the local bus 16. The BTI 36 reads all data from the local bus 16 and sends it to the transmit FIFOs of each of the ports not then transmitting data to the local bus 16. The BTI 36 is responsible for asserting the BUS_XOFF signal which ceases data transfer onto the local bus 16, and which freezes the arbitration function of the BAR 20 at its current state. Data transfer and arbitration are resumed when the BUS_XOFF signal is de-asserted.

Figure 4:
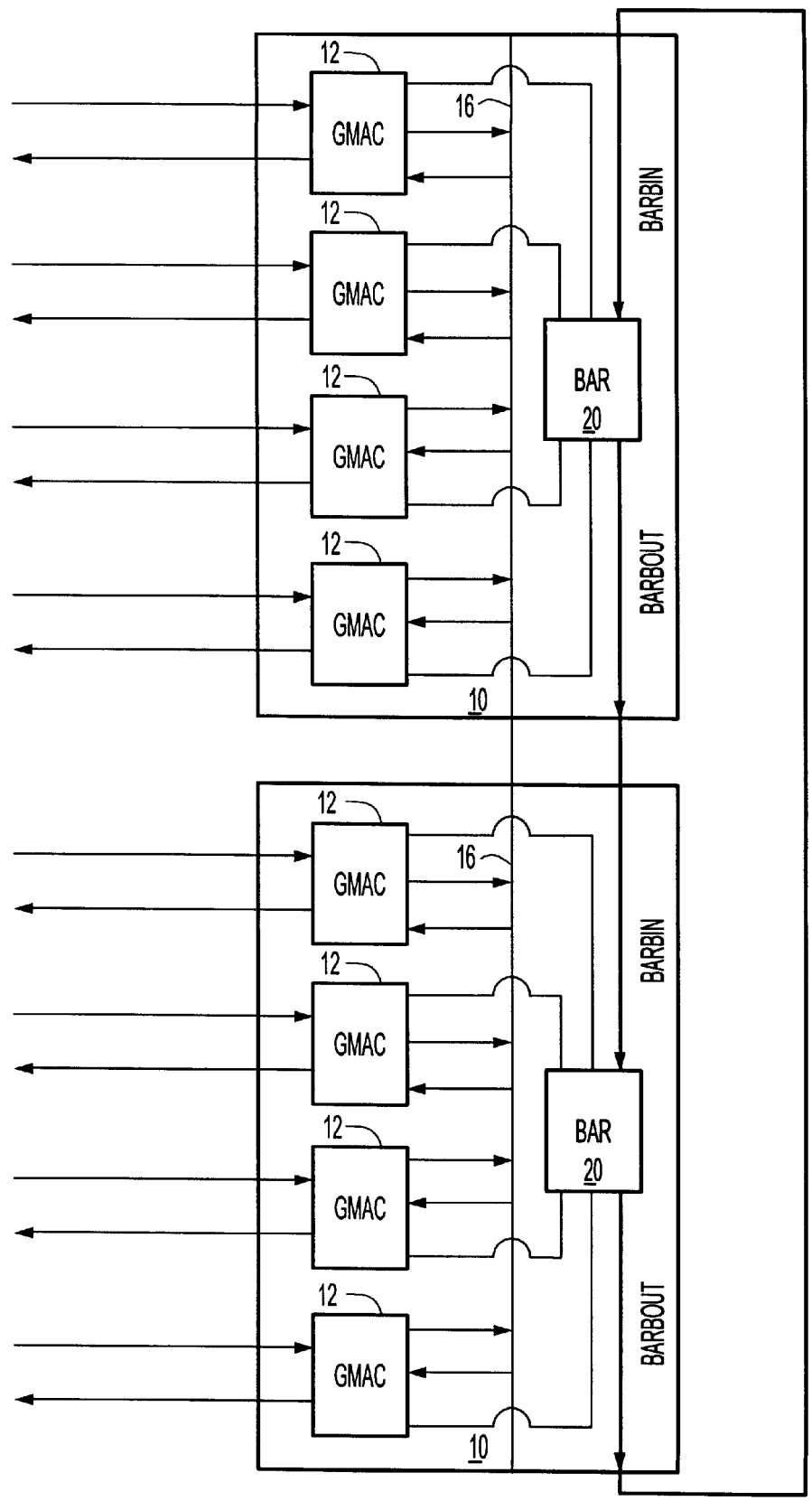
FIG. 4 is a schematic diagram illustrating cascading of two repeaters according to the present invention.

The BAR 20 performs the round-robin arbitration. Enable lines between the BAR 20 and the individual GMACs 12 are shown in FIG. 4 for each of plural buffered repeaters 10. With multiple devices cascaded as shown in FIG. 4, the arbitration is distributed; no central arbiter exists in the preferred embodiment. In the cascaded device embodiment, there are two levels of arbitration: between buffered repeater devices 10; and between the ports within each device. A Bus Arbitration In (BARBIN) signal is received by the BAR 20 as an indication that this buffered repeater 10 is allowed to let each port having a packet in the respective receive FIFO 14 to transmit on the local bus 16. When a port is given access to the local bus 16, it waits until the bus 16 is idle, or until an End of Packet identifier is present. If none of the ports are seeking access to the local bus 16 for writing, or if the port currently transmitting is the last in succession within that buffered repeater 10, or if it is the last port which seeks access to the bus 16, the BAR 20 asserts a Bus Arbitration Out (BARBOUT) signal as a BARBIN input to the BAR 20 of the next consecutive buffered repeater 10. The BAR 20 in that next buffered repeater 20 then begins the local arbitration process among the respective GMACs 12. The arbitration process among plural cascaded buffered repeaters is "kickstarted" upon initialization by a processor setting a Kickstart Arb bit in a device control register (via the respective processor interface 22) for one of the cascaded devices 10.

In the case of a single buffered repeater, the BARBOUT and BARBIN pins for the BAR 20 are tied together, and round-robin arbitration takes place solely within the device 10.

The open collector signal BUS_XOFF is interconnected through all cascaded devices such that when any one port of a first buffered repeater according to the present invention asserts the BUS_XOFF signal, all arbitration within the cascaded device is halted.

The processor interface (PCI) 22 contains logic to interface to the internal registers of the device. In one embodiment of the present invention, the PCI 22 is specifically designed to interface to a Motorola MC68EN302 or similar processor; other embodiments of the PCI 22 may be designed to accommodate the respective processor employed. The PCI 22 block illustrated further includes buffers necessary to multiplex/demultiplex processor address and data buses. Many of the registers for the presently disclosed buffered repeater are located in the PCI 22, while yet others are distributed about the repeater. The PCI 22 further contains a mux to output the data from a particular register addressed by the processor, logic to generate write strobes for each writable or clearable register, a state machine to read and generate the interface control signals and insert wait states, and logic to generate interrupts to the processor. The PCI 22 has its own internal clock since the PCI 22 operates independently of the remainder of the device.

An LED interface (LEDI) 38 contains logic necessary for the buffered repeater to drive external bi-color light emitting diodes (LEDs). These five LEDs are used to monitor receive traffic at each of the four ports and on the local bus 16. In a first embodiment, there are five yellow/green bi-color LEDs. LED test is enabled by allowing the processor interfaced through the PCI 22 to control the state of any of the LEDs through the LEDI 38.

Internal test logic may be provided which is accessed by the external processor through the PCI 22 and other internal test circuitry.

These and other examples of the invention illustrated above are intended by way of example and the actual scope of the invention is to be limited solely by the scope and spirit of the following claims.

What is claimed is:

1. A full duplex buffered repeater providing symmetric flow control, comprising:
    a plurality of full duplex ports, each comprising respective receive and transmit queues; and
    a local bus in mutual communication with each of said ports via said respective receive and transmit queues;
    wherein, with respect to each of said full duplex ports, said receive queue is adapted for receiving data from an external element, for buffering said data, and for transmitting said data to said local bus for receipt by any of said transmit queues,
    wherein each of said transmit queues has a threshold associated therewith and each port is operative to assert a common bus disable signal to each other of said ports when sufficient data are stored in said transmit queue to achieve said transmit queue threshold,
    wherein assertion of said common bus disable signal by one of said ports disables transmission from said receive queues of all of said ports to said local bus, and
    wherein each of said ports checks said bus disable signal prior to transmitting data from said respective receive queue onto said local bus, transmits said data if said bus disable signal is not asserted by any of said ports, and does not transmit said data if said disable signal is asserted by any of said ports.

2. The repeater of claim 1, wherein each of said ports further comprising circuitry for receiving an external flow control frame and for pausing transmission of data from said transmit queue in response thereto.

3. The repeater of claim 1, wherein each of said receive queues further comprises a threshold, and each of said ports further comprises circuitry for issuing a flow control frame to said external element in response to sufficient data being stored in said receive queue to achieve said receive queue threshold.

4. The repeater of claim 3, wherein said circuitry further comprises a multiplexer at an output of said transmit queue for interjecting said external flow control frame into a data stream from said transmit queue.

5. The repeater of claim 1, wherein said bus disable signal is an open-collector signal in communication with each of said ports.

6. The repeater of claim 1 further comprising a bus arbiter in communication with said ports for arbitrating between said ports an opportunity to transmit data from a respective receive queue onto said local bus.

7. The repeater of claim 1, wherein said repeater is cascadable with one or more like repeaters, wherein said local bus and said bus disable signal are common to each of said repeaters.

8. A Gigabit Ethernet full duplex buffered repeater enabling symmetric flow control, comprising:
    plural full duplex ports each for connection to a respective link and comprising
        a media access controller,
        a receive queue for receiving data from said respective link under the control of said controller, and
        a transmit queue for transmitting data to said respective link under the control of said controller; and
    a local bus for receiving data from said receive queues and for transmitting said data to said transmit queues,
    each of said controllers for maintaining a threshold for each of said receive and transmit queues, for issuing a flow control frame in response to said receive queue threshold being met or exceeded, for pausing transmission of data from said transmit queue when a flow control frame is received by said port over said respective link, and for disabling transmission of data to said local bus by any of said ports when said transmit queue threshold is met or exceeded.

9. The repeater of claim 8 further comprising a local bus disable signal under the control of each of said controllers for disabling transmission of data onto said local bus by any of said ports when one of said transmit queue thresholds is met or exceeded.

10. The repeater of claim 9 further comprising external connections for extending said local bus disable signal and said local bus to one or more like repeaters for forming a single cascaded repeater.

11. The repeater of claim 10 further comprising an arbiter for arbitrating local bus access between said repeaters of said cascaded repeater.

12. The repeater of claim 9, wherein each of said controllers checks said bus disable signal prior to transmitting onto said local bus, and does not transmit if said bus disable signal is asserted by any of said ports.

13. The repeater of claim 8 further comprising an open-collector bus disable signal between each of said ports and assertable by any one of said ports when said respective transmit queue threshold is met or exceeded for disabling transmission of data onto said local bus.

14. The repeater of claim 8 further comprising an arbiter for arbitrating an opportunity to transmit data onto said local bus by one of said ports.

* * * * *

UNITED STATES PATENT AND TRADEMARK OFFICE
CERTIFICATE OF CORRECTION

| | | |
|---|---|---|
| PATENT NO. | : 6,295,281 B1 | Page 1 of 1 |
| DATED | : September 25, 2001 | |
| INVENTOR(S) | : Frank A. Itkowsky et al. | |

It is certified that error appears in the above-identified patent and that said Letters Patent is hereby corrected as shown below:

Column 5,
Line 61, "1.5x36" should read -- 1.5Kx36 --.

Signed and Sealed this

Second Day of July, 2002

Attest:

JAMES E. ROGAN
Attesting Officer            Director of the United States Patent and Trademark Office